(12) United States Patent
Tsukamoto et al.

(10) Patent No.: US 8,655,297 B2
(45) Date of Patent: Feb. 18, 2014

(54) NONLINEAR DISTORTION COMPENSATING RECEIVER AND NONLINEAR DISTORTION COMPENSATION METHOD

(75) Inventors: Satoshi Tsukamoto, Osaka (JP); Noriaki Saito, Tokyo (JP); Yoshito Shimizu, Kanagawa (JP); Tadashi Morita, Kanagawa (JP); Katsuaki Abe, Kanagawa (JP)

(73) Assignee: Panasonic Corporation, Osaka (JP)

( * ) Notice: Subject to any disclaimer, the term of this patent is extended or adjusted under 35 U.S.C. 154(b) by 85 days.

(21) Appl. No.: 13/378,477

(22) PCT Filed: Jul. 5, 2010

(86) PCT No.: PCT/JP2010/004385
§ 371 (c)(1),
(2), (4) Date: Dec. 15, 2011

(87) PCT Pub. No.: WO2011/004578
PCT Pub. Date: Jan. 13, 2011

(65) Prior Publication Data
US 2012/0086504 A1    Apr. 12, 2012

(30) Foreign Application Priority Data
Jul. 6, 2009    (JP) .................................. 2009-160031

(51) Int. Cl.
*H04B 1/10*    (2006.01)

(52) U.S. Cl.
USPC .......................................... 455/295; 455/302

(58) Field of Classification Search
USPC .................................. 455/295, 302–307, 63.1
See application file for complete search history.

(56) References Cited

U.S. PATENT DOCUMENTS

| 8,170,487 | B2* | 5/2012 | Sahota et al. | ................ 455/63.1 |
| 2001/0033238 | A1* | 10/2001 | Velazquez | ...................... 341/118 |
| 2009/0086863 | A1 | 4/2009 | Komninakis et al. | |

FOREIGN PATENT DOCUMENTS

| CN | 101502007 A | 8/2009 |
| JP | 2001-144636 A | 5/2001 |
| JP | 2002-043992 A | 2/2002 |
| JP | 2010-500831 A | 1/2010 |

OTHER PUBLICATIONS

Edward A. Keehr, et al., "Equalization of Third-Order Intermodulation Products in Wideband Direct Conversion Receivers", IEEE Journal of Solid-State Circuits, vol. 43, No. 12, Dec. 2008.

(Continued)

*Primary Examiner* — Christian Hannon
(74) *Attorney, Agent, or Firm* — Pearne & Gordon LLP

(57) ABSTRACT

Disclosed are a nonlinear distortion compensating receiver and nonlinear distortion compensation method, wherein nonlinear distortion is reduced with a simple circuit configuration. A correction (opposite characteristics) filter (104) has characteristics opposite that of the frequency characteristics of a direct sampling mixer (102) and corrects signals sampled by the direct sampling mixer (102). In the main path, a LPF (106) extracts a frequency band component of a desired signal from the corrected signal. In the replica path, a BPF (107) extracts the frequency band component of a blocker signal from the corrected signal. A cubing circuit (108) uses the frequency band component of the blocker signal to generate a replica signal for the nonlinear distortion. An adaptive filter (110) performs filter processing on the replica signal while updating the filter coefficients. A subtractor (111) subtracts the output signal of the adaptive filter (110) from the frequency band component of the extracted desired signal and outputs the subtraction result as the desired signal.

7 Claims, 8 Drawing Sheets

(56) References Cited

OTHER PUBLICATIONS

Mikko Valkama, et al., "Advanced Digital Signal Processing Techniques for Compensation of Nonlinear Distortion in Wideband Multicarrier Radio Receivers", IEEE Transactions on Microwave Theory and Techniques, vol. 54, No. 6, Jun. 2006.

International Search Report for PCT/JP2010/004385 dated Aug. 10, 2010.

* cited by examiner

NONLINEAR DISTORTION COMPENSATING RECEIVER AND NONLINEAR DISTORTION COMPENSATION METHOD

TECHNICAL FIELD

The present invention relates to nonlinear distortion compensation receiver and nonlinear distortion compensation method for adaptively compensating nonlinear distortion.

BACKGROUND ART

In recent years, miniaturization and low power consumption of a radio communication apparatus have been developed. Although the power supply voltage has been lowered following the development of semiconductor process, it is widely known that the linearity of an analogue circuit is deteriorated due to the reduction of the power supply voltage. Furthermore, many radio standards, such as an integrated services digital broadcasting-terrestrial (ISDB-T), is required to receive even under the condition where a strong neighboring interfering wave is present. Therefore, there is a growing demand for distortion compensation in order to improve the linearity at a receiver.

There is a conventional distortion compensation receiver shown in FIG. 1 (for example, see non-patent literature 1). In FIG. 1, distortion compensation receiver 10 has low noise amplifier (LNA) 11, cubic circuit 12, down mixers 13-1 and 13-2, local oscillator (LO) 14, analog low pass filters (LPFs) 15-1 and 15-2, analog-to-digital converters (ADCs) 16-1 and 16-2, digital LPFs 17-1 and 17-2, adaptive filter 18, and adder 19.

Conventional distortion compensation receiver 10 shown in FIG. 1 is divided an input signal into two paths, the original reception circuit (main path) and the path (replica path) for generating a replica signal of distortion. Next, by cubing a replica path, distortion compensation receiver 10 generates a replica signal of a third-order distortion component (inter modulation (IM) 3). Next, distortion compensation receiver 10 frequency-converts this replica signal by down mixer 13-2, extracts a reception band component from the replica signal by band-limiting by LPF 15-2. Next, distortion compensation receiver 10 allows this extracted signal to pass adaptive filter 18 and then subtracts the extracted signal from the main path signal. By this means, distortion compensation receiver 10 reduces a third-order distortion component included in the main path signal.

There is other distortion compensation receiver shown in FIG. 2 (for example, see non-patent literature 2). In FIG. 2, distortion compensation receiver 20 has nonlinear circuit 21, band division filter 22, distortion generation circuit 23, band limitation filter 24, adaptive filter 25, delayer 26, and adder 27.

With conventional distortion compensation receiver 20 shown in FIG. 2, band division filter 22 divides a signal amplified by nonlinear circuit 21 into a desired band signal and other band signal. Distortion generation circuit 23 generates a replica signal of distortion component (IM) by using a signal of a band other than the desired band. A replica signal is band-limited at band limitation filter 24. Later, by subtracting a band-limited replica signal from the main path signal that is output from delayer 26 after passing adaptive filter 25, distortion compensation receiver 20 reduces nonlinear distortion included in the main path signal.

CITATION LIST

Non-Patent Literature

NPL 1
"Equalization of Third-Order intermodulation Products in Wideband Direct Conversion Receivers," IEEE Journal of Solid-State Circuits, vol. 43, no. 12, p.p. 2853-2867, 2008

NPL 2
"Advanced Digital Signal Processing Techniques for Compensation of Nonlinear Distortion in Wideband Multicarrier Radio Receivers," IEEE Transactions on Microwave theory and techniques, vol. 1.54, no. 6, p.p. 2356-2366, 2006

SUMMARY OF INVENTION

Technical Problem

However, the conventional configuration has a problem as shown below. In the configuration described in non-patent literature 1, the distortion of a desired wave itself is included in the output of cubic circuit 12. Therefore, under the condition where a strong desired wave is present, there has been a problem that adaptive filter 18 does not operate appropriately due to the correlation of the desired wave and the distortion component. Furthermore, in order to generate a replica signal of a distortion component, for example, cubic circuit 12, down mixers 13-1 and 13-2, LPFs 15-1 and 15-2 to band-limit, and ADCs 16-1 and 16-2 are required, so that a circuit scale increases.

Also, the configuration described in non-patent literature 2 uses a mixer, such as, a direct sampling mixer (DSM) that frequency-converts and band-limits at the same time. However, when using a direct sampling mixer (DSM), it is difficult to generate an accurate replica signal of a distortion component. For this reason, there has been a problem that the suppressor amount of a third-order distortion component is limited.

It is therefore an object of the present invention to provide a distortion compensation receiver and distortion compensation method that can reduce nonlinear distortion with a simple circuit configuration.

Solution to Problem

The nonlinear distortion compensation receiver of the present invention includes: a sampling mixer that samples an input signal by frequency-converting and band-limiting the input signal; a correction filter that has an inverse characteristic of a frequency characteristic of the sampling mixer, corrects the frequency characteristic of the sampled input signal, and outputs the corrected input signal as the correction signal; a main signal extracting section that extracts a main path signal including a frequency band component of a desired wave from the correction signal; a replica signal generation section that extracts a frequency band component of an interfering wave from the correction signal as a replica path signal, and generates a replica signal of a nonlinear distortion component generated in the sampling mixer by using the frequency band component of the extracted interfering wave; an adaptive filter that performs adaptive filter processing to the replica signal with updating a filter coefficient; and a subtraction section that subtracts an output signal of the adaptive filter from the main path signal extracted by the main signal extracting section and outputs a subtracted result as a desired wave signal, where the adaptive filter updates the filter coefficient based on an output signal of the subtraction section.

The nonlinear distortion compensation method of the present invention includes: sampling an input signal by frequency-converting and band-limiting the input signal; correcting a frequency characteristic of the sampled input signal and outputting the corrected input signal as a correction signal by using an inverse characteristic of the frequency characteristic of sampling processing; extracting a main path signal including a frequency band component of a desired wave from the correction signal; extracting a frequency band component of an interfering wave from the correction signal as a replica path signal and generating a replica signal of a nonlinear distortion component generated in the sampling processing by using the frequency band component of the extracted interfering wave; performing adaptive filter processing to the replica signal with updating a filter coefficient; and subtracting the replica signal where the adaptive filter processing is performed, from the extracted main path signal, and outputting a subtracted result as a desired wave signal, where the adaptive filter processing updates the filter coefficient based on a signal that shows the subtracted result.

Advantageous Effects of Invention

According to the present invention, digital signal processing can perform the generation of a replica signal of a distortion component and adaptive filtering, so that it is possible to adaptively compensate for nonlinear distortion with a simple circuit configuration. Especially, it is possible to precisely cancel a distortion component of a neighboring interfering wave signal. Furthermore, since a desired wave is no included in a generation circuit of a replica signal of a distortion component, it is possible to perform distortion compensation precisely, regardless of presence or absence, and the strength of a desired wave.

DESCRIPTION OF EMBODIMENTS

Embodiments of the present invention will be described in detail with reference to the accompanying drawings.

(Embodiment 1)

Figure 1:
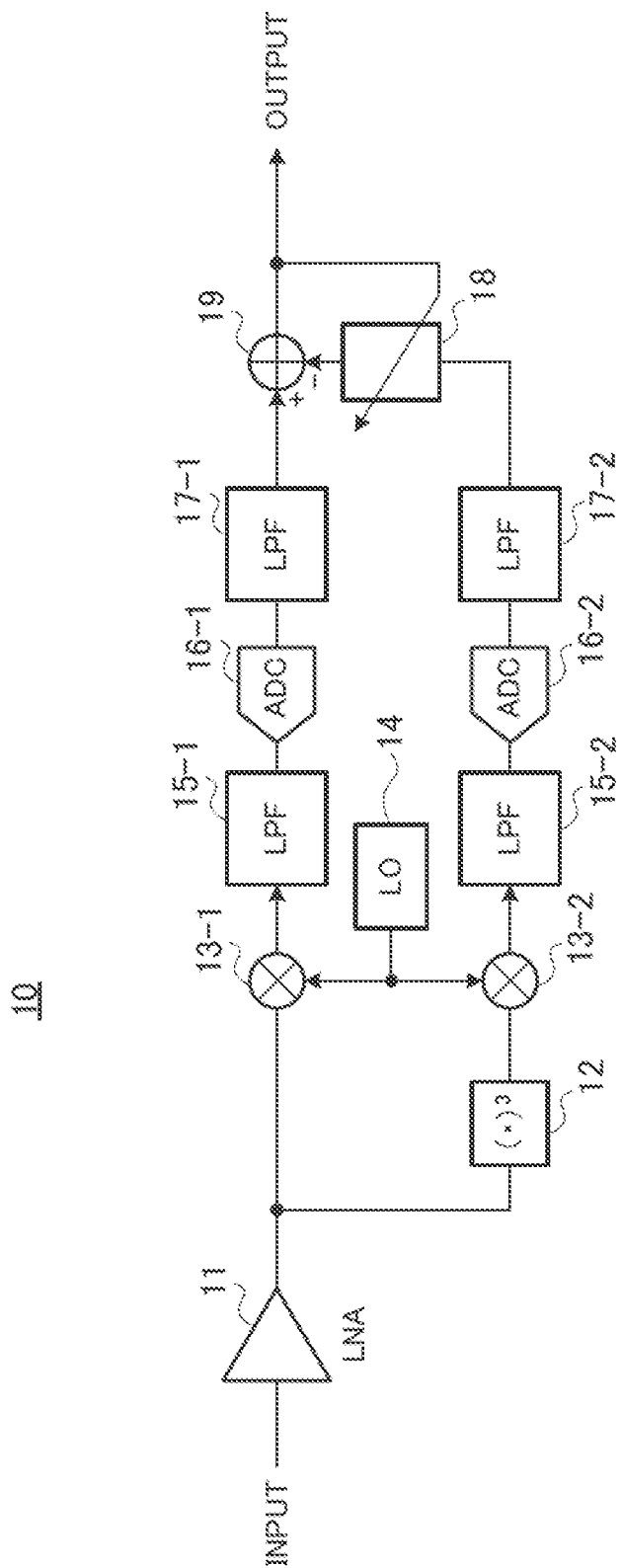
FIG. 1 shows an example of a configuration of a conventional distortion compensation receiver.
Figure 2:
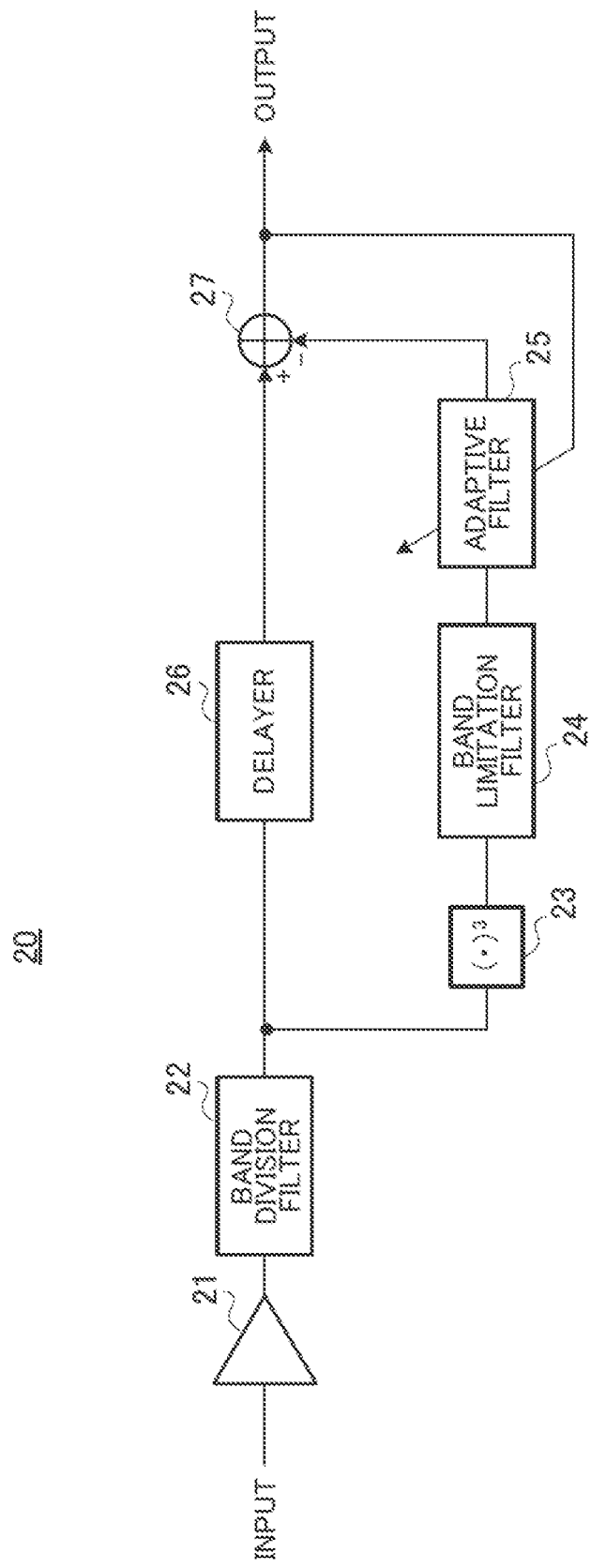
FIG. 2 shows an example of a configuration of a conventional distortion compensation receiver.
Figure 3:
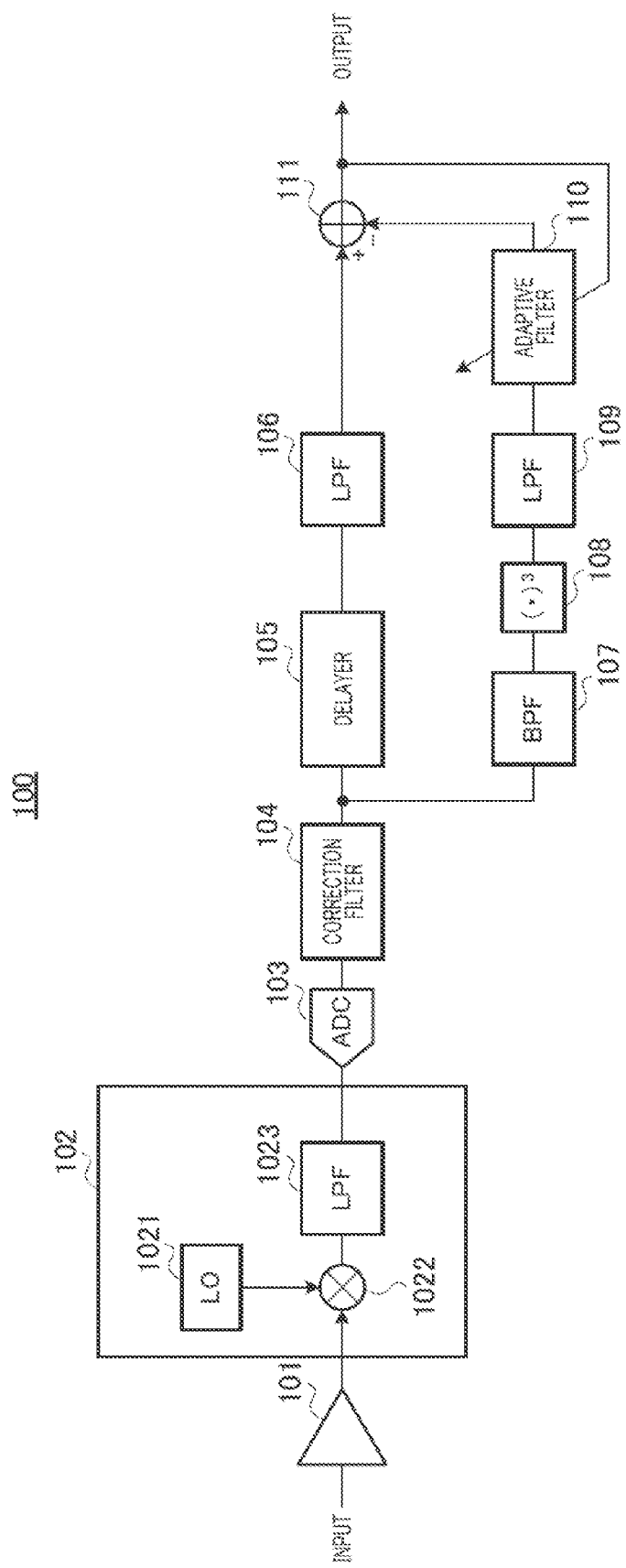
FIG. 3 is a block diagram showing a main configuration of a nonlinear distortion compensation receiver according to embodiment 1 of the present invention.

FIG. 3 is a block diagram showing a main configuration of a nonlinear distortion compensation receiver according to embodiment 1 of the present invention.

LNA 101 amplifies an input signal. LNA 101 outputs the amplified signal to direct sampling mixer (DSM) 102.

Direct sampling mixer 102 includes LO 1021, mixer 1022, and LPF 1023, frequency-converts (down-converts) the amplified signal into a low frequency, and band-limits the signal after frequency conversion. Specifically, mixer 1022 frequency-converts an amplified signal into a low frequency by multiplying a local frequency signal output from LO 1021 and an amplified signal output from LNA 101. LPF 1023 band-limits a frequency-converted signal, and, by this means, direct sampling mixer 102 performs direct sampling to an amplified signal output from LNA 101. Direct sampling mixer 102 outputs the signal after direct sampling to ADC 103.

ADC 103 is provided in a rear stage of direct sampling mixer 102, and performs analog-to-digital (A/D) conversion processing to the signal after direct sampling. ADC 103 outputs a digital signal after A/D conversion to correction (inverse characteristic) filter 104.

Correction (inverse characteristic) filter 104 has an inverse characteristic with a frequency characteristic of direct sampling mixer 102. For example, when a filter characteristic of LPF 1023 included in direct sampling mixer 102 has band deviation, correction (inverse characteristic) filter 104 has an inverse characteristic with a filter characteristic of LPF 1023.

Correction (inverse characteristic) filter 104 is provided in a rear stage of ADC 103, and corrects a digital signal after A/D conversion. By this means, for example, when a filter characteristic of LPF 1023 has band deviation, the band deviation is compensated in advance. When a frequency characteristic of LNA 101 is not flat, correction (inverse characteristic) filter 104 has inverse characteristics of frequency characteristics of LNA 101 and direct sampling mixer 102. By this means, the frequency characteristics of LNA 101 and direct sampling mixer 102 are corrected.

Correction (inverse characteristic) filter 104 separates a corrected signal into the main path including delayer 105 and LPF 106, and the replica path including band pass filter (BPF) 107, cubic circuit 108, LPF 109, and adaptive filter 110. Here, the main path is an original reception circuit section of nonlinear distortion compensation receiver 100 in order to receive the corrected signal, and the replica path is a circuit section for generating a replica signal of distortion. Hereinafter, a signal that passes the above main path is referred to as "main path signal" and a signal that passes the above replica path is referred to as "replica path signal."

Delayer 105 delays a main path signal and outputs the result to LPF 106. The reason to delay a main path signal in delayer 105 is to resolve the relative time lag generated between the main path and replica path, by, for example, filtering processing in BPF 107 arranged in the replica path.

LPF 106 band-limits a main path signal delayed by delayer 105, and extracts a frequency band component of the desired wave from a band component of the main path signal. LPF 106 outputs the band-limited main path signal to subtractor 111.

By band-limiting a replica path signal, from a band component of a replica path signal, BPF 107 extracts the basic band component where a component, that is the source of distortion due to an interfering wave, is included. BPF 107 outputs the band-limited replica path signal to cubic circuit 108.

Cubic circuit 108 generates an IM3 replica by cubing a band-limited replica path signal. Cubic circuit 108 outputs the IM3 replica to LPF 109.

LPF 109 band-limits an IM3 replica and extracts a frequency band component of the IM3 replica only. LPF 109 outputs the band-limited IM3 replica to adaptive filter 110.

Adaptive filter 110 receives as input the band-limited IM3 replica output from LPF 109, performs filter processing to the band-limited IM3 replica, and transmits the filter output signal after filter processing to subtractor 111. Adaptive filter 110 is formed by, for example, finite impulse response (FIR) filter. Also, adaptive filter 110 adaptively updates a filter coefficient based on an error signal fed back from subtractor 111 described later.

Subtractor 111 receives as input an output signal of adaptive filter 110 and a received signal (main path signal) band-limited by LPF 106, subtracts an output signal of adaptive filter 110 from a main path signal, and outputs the subtracted result as a desired wave. Also, subtractor 111 feeds back the difference (subtracted result) between the main path signal and the output signal of adaptive filter 110 as an error signal, to adaptive filter 110.

Adaptive filter 110 performs filter processing (adaptive filter processing) by using an adaptation algorithm so as to minimize a root-mean-square of this error signal, and adequately updates a filter coefficient of adaptive filter 110. The root-mean-square of an error signal is equivalent to the power of an error signal. For this reason, when an error signal is not an original desired wave and IM3 is still included in the error signal, the root-mean-square value of the error signal increases compared to the power of the original desired wave. Adaptive filter 110 performs an adaptation algorithm processing so as to minimize the root-mean-square of an error signal and adequately updates a filter coefficient, so that it is possible to cancel IM3 from a main path signal at subtractor 111. As an adaptation algorithm, it is possible to use, for example, a least mean square (LMS) algorithm.

Next, an operation of nonlinear distortion compensation receiver 100 will be described.

An analog signal transmitted from a transmission station (not shown) is received at an antenna (not shown), and is amplified at LNA 101. At direct sampling mixer 102, the amplified analog signal is frequency-converted (down-converted) into a low frequency by using a local frequency signal from LO 1021, by mixer 1022. Also, a predetermined frequency band component is extracted by filter processing by LPF 1023 of direct sampling mixer 102, and by this means a baseband signal is acquired. A baseband signal is converted into a digital signal by ADC 103. A digital signal is corrected by correction (inverse characteristic) filter 104 having a filter characteristic that is inverse with a filter characteristic of LPF 1023 included in direct sampling mixer 102. By this means, it is possible to compensate for the band deviation generated by LPF 1023.

The corrected digital signal is separated into a main path and a replica path. In the main path, the corrected digital signal (main path signal) is delayed by delayer 105, and the delayed main path signal is band-limited by LPF 106. In the replica path, the corrected digital signal (replica path signal) is band-limited by BPF 107, an interfering wave component other than the desired wave is extracted. Also, cubic circuit 108 generates the band-limited replica path signal, that is, the IM3 replica of the interfering wave component is generated, and adaptive filter 110 performs filter processing to IM3 replica of the interfering wave component. Subtractor 111 subtracts the IM3 replica of the interfering wave component after filter processing from the main path signal, and by this means IM3 is cancelled.

As above, with the present embodiment, correction (inverse characteristic) filter 104 has an inverse characteristic with a frequency characteristic of direct sampling mixer 102 and corrects a signal sampled by direct sampling mixer 102. With the main path, LPF 106 extracts a frequency band component of a desired wave from the corrected signal. With the replica path, BPF 107 extracts a frequency band component of an interfering wave from a frequency component of the corrected signal. Cubic circuit 108 generates a replica signal of nonlinear distortion by using the frequency band component of the interfering wave. Adaptive filter 110 performs filter processing to the replica signal with updating a filter coefficient. Subtractor 111 subtracts an output signal of adaptive filter 110 from the extracted frequency band component of the desired wave, and outputs the subtracted result as a desired wave. By this means, even when a frequency characteristic of direct sampling mixer 102 is not flat, the frequency characteristic of a signal after direct sampling is corrected in advance by correction (inverse characteristic) filter 104. As a result, it is possible to generate a replica signal of distortion accurately, and remove a distortion component from a reception signal accurately. Also, a replica signal of distortion will be generated without using the frequency band component of the desired wave, so that it is possible to perform distortion compensation precisely regardless of presence or absence, or the strength of the desired wave.

(Embodiment 2)

Embodiment 1 has described a direct conversion receiver (DCR). The present embodiment will describe a low intermediate frequency (low-IF) receiver.

Figure 4:
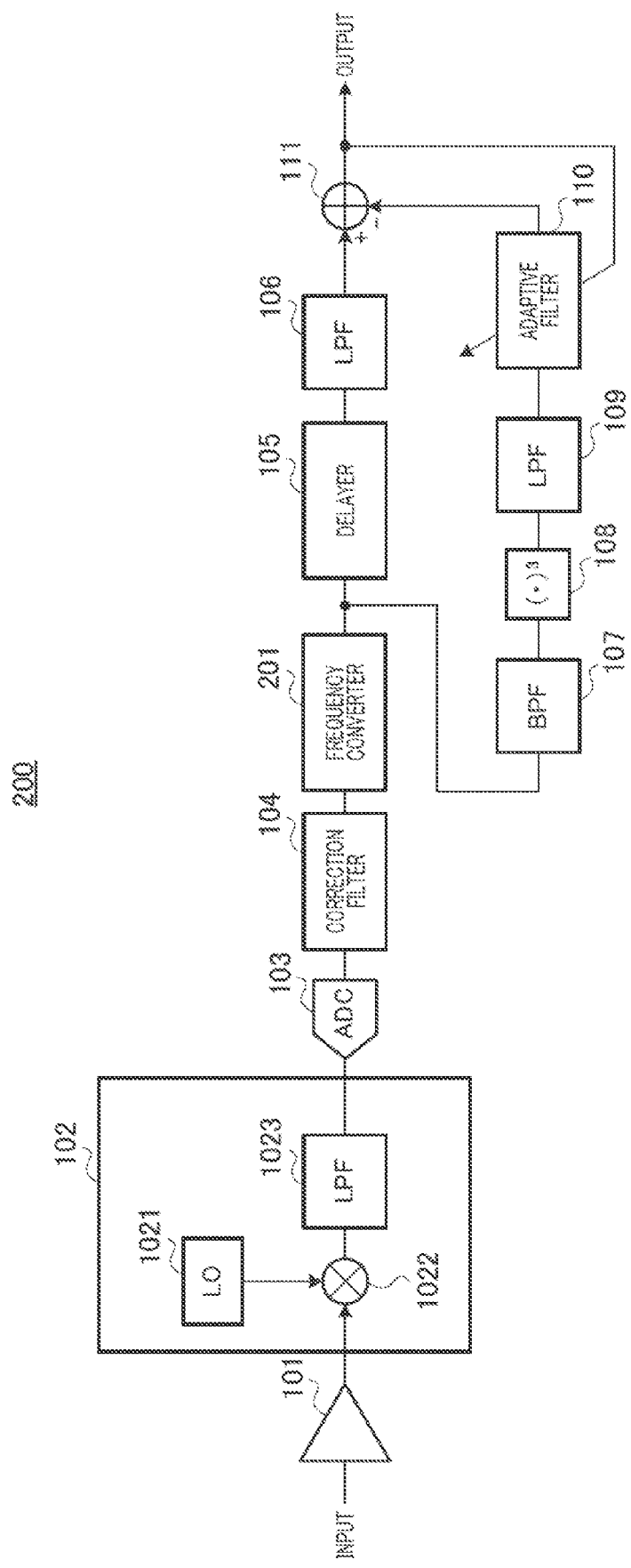
FIG. 4 is a block diagram showing a main configuration of a nonlinear distortion compensation receiver according to embodiment 2 of the present invention.

FIG. 4 is a block diagram showing a main configuration of a nonlinear distortion compensation receiver according to embodiment 2 of the present invention. In a nonlinear distortion compensation receiver according to the present embodiment of FIG. 4, the same components as FIG. 3 will be assigned the same reference numerals as FIG. 3 and their explanations will be omitted. Nonlinear distortion compensation receiver 200 of FIG. 4 employs a configuration that adds frequency converter 201 to nonlinear distortion compensation receiver 100 of FIG. 3.

Frequency converter 201 is provided in a rear stage of correction (inverse characteristic) filter 104 and converts a signal after a correction filter into a zero IF signal. Frequency converter 201 separates the zero IF converted signal into a main path that is the original reception circuit section of nonlinear distortion compensation receiver 200, and a replica path for generating a replica signal of distortion.

Hereinafter, as embodiment 1, in the main path, delayer 105 delays the corrected digital signal (main path signal), and LPF 106 band-limits the delayed main path signal. Also, in the replica path, BPF 107 band-limits the corrected digital signal (replica path signal), and extracts an interfering wave component other than a desired wave. Cubic circuit 108 generates the band-limited replica path signal, that is, an IM3 replica of the interfering wave component, and adaptive filter 110 performs filter processing to the IM3 replica of the interfering wave component. Subtractor 111 subtracts the IM3 replica of the interfering wave component after filter processing from the main path signal, and by this means IM3 is cancelled.

As above, in a rear stage of correction (inverse characteristic) filter 104, the present embodiment provides frequency converter 201 that converts a signal after the correction filter into a zero IF signal. By this means, in the main path and replica path, a zero IF signal that does not include a DC component will be processed, so that it is possible to prevent the influence due to a DC offset.

With the present embodiment, although a configuration example of nonlinear distortion compensation receiver 200 where an IF amplifier is omitted is shown in FIG. 4, this is by no means limiting. Obviously, nonlinear distortion compensation receiver 200 can include an IF amplifier. This configuration can suppress not only the distortion at direct sampling mixer 102 (or, LNA 101 and direct sampling mixer 102), but also the distortion at the stage of an intermediate frequency (IF) in some degree.

(Embodiment 3)

Embodiment 1 and embodiment 2 have been explained on the premise that adaptive filter 110 generates the replica path signal and is arranged to a replica path is a linear filter. The present embodiment will describe a case where an adaptive filter arranged to the replica path is a nonlinear adaptive filter.

Figure 5:
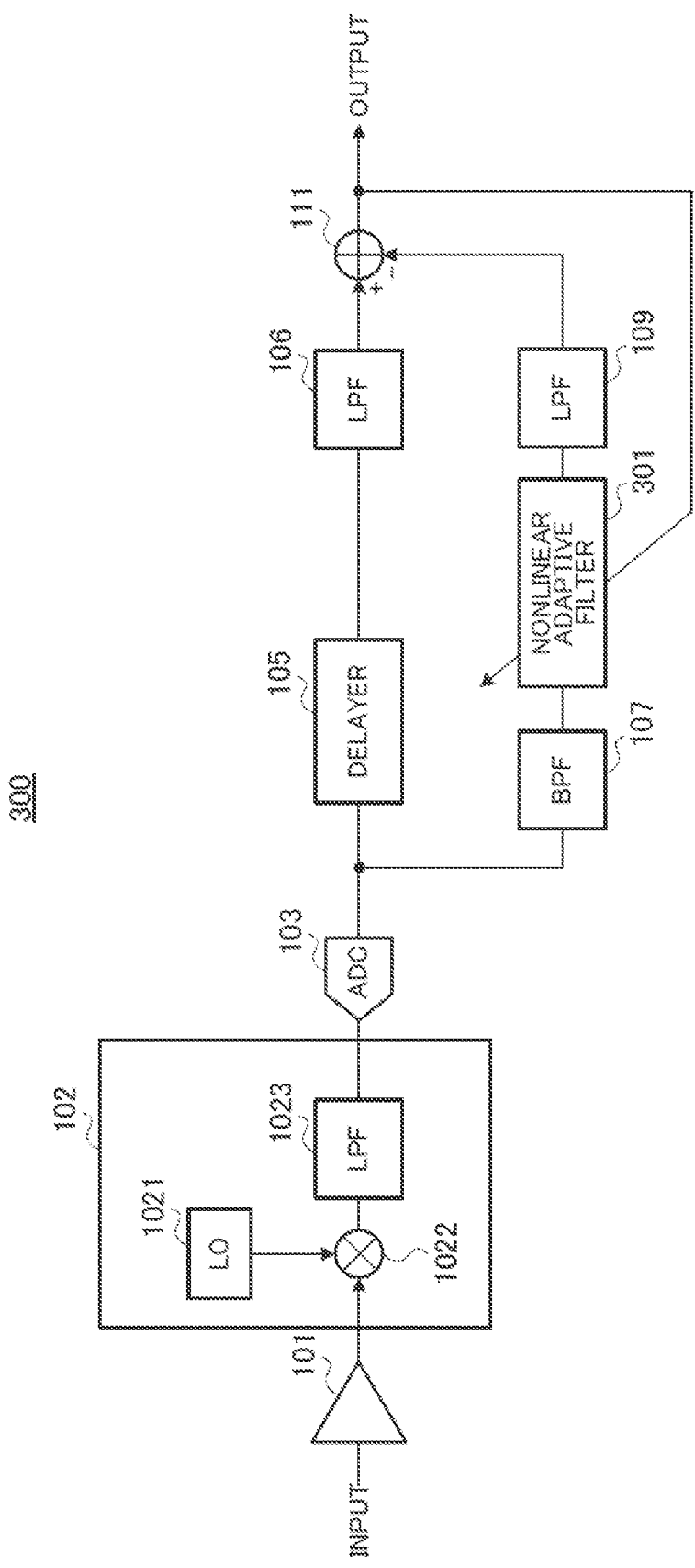
FIG. 5 is a block diagram showing a main configuration of a nonlinear distortion compensation receiver according to embodiment 3 of the present invention.

FIG. 5 is a block diagram showing a main configuration of a nonlinear distortion compensation receiver according to embodiment 3 of the present invention. In a nonlinear distortion compensation receiver according, to the present embodiment of FIG. 5, the same components as FIG. 3 will be assigned the same reference numerals as FIG. 3 and their explanations will be omitted. Compared to nonlinear distortion compensation receiver 100 of FIG. 3, nonlinear distortion compensation receiver 300 of FIG. 5 employs a configuration that removes correction (inverse characteristic) filter 104, cubic circuit 108, and adaptive filter 110, and adds nonlinear adaptive filter 301. Also, nonlinear adaptive filter 301 is equivalent to the one where the functions of correction (inverse characteristic) filter 104 and cubic circuit 108 are built in adaptive filter 110. Therefore, the present embodiment can reduce the circuit scale compared to embodiment 1 and embodiment 2.

Nonlinear adaptive filter 301 receives as input the band-limited replica path signal that is band-limited by BPF 107 and performs nonlinear filtering processing to the band-limited replica path signal. As nonlinear adaptive filter 301, it is possible to use, for example, a nonlinear Volterra filter.

As described above, nonlinear adaptive filter 301 is equivalent to the one where the functions of correction (inverse characteristic) filter 104 and cubic circuit 108 are built in adaptive filter 110. In the following, a case where nonlinear adaptive filter 301 is a filter where the functions of correction (inverse characteristic) filter 104 and cubic circuit 108 are built in adaptive filter 110 will be explained below.

A filter characteristic of direct sampling mixer 102 formed by LO 1021, mixer 1022 and LPF 1023 is represented by equation 1.

(Equation 1)
$$H(z) = \sum_k h(k) z^{-k} \quad [1]$$

In equation 1, $z^{-1}$ is a delay operator.

A filter characteristic of correction (inverse characteristic) filter 104 is represented by equation 2.

(Equation 2)
$$G(z) = \sum_k g(k) z^{-k} \quad [2]$$

Here, a neighboring interfering wave signal before passing correction (inverse characteristic) filter 104 is assumed as x (n). With nonlinear distortion compensation receiver 100 shown in FIG. 3, a replica path signal is generated by cubing a signal after passing correction (inverse characteristic) filter 104. Signal $y_1$ after passing correction (inverse characteristic) filter 104 is represented as equation 3-1, and the replica path* signal y generated by cubic circuit 108 by using a signal passing correction (inverse characteristic) filter 104 is represented as equation 3-2.

(Equation 3-1)
$$y_1(n) = \sum_k g(k) x(n-k) \quad [3]$$

(Equation 3-2)
$$y(n) = y_1(n)^3 = \left( \sum_k g(k) x(n-k) \right)^3$$

Here, by developing equation 3-2, that shows an input-output of a virtual block having the functions of correction (inverse characteristic) filter 104 and cubic circuit 108, it is possible to represent as equation 4.

(Equation 4)
$$y(n) = \sum_k \sum_l \sum_m g(k) g(l) g(m) x(n-k) x(n-l) x(n-m) \quad [4]$$

Meanwhile, when nonlinear adaptive filter 301 is a third order Volterra filter, the input-output of nonlinear adaptive filter 301 can be calculated by equation 5.

(Equation 5)
$$y(n) = c_0 + \sum_k c_1(k) x(n-k) + \sum_k \sum_l c_2(k,l)(n-k) x(n-l) + \sum_k \sum_l \sum_m c_3(k,l,m) x(n-k) x(n-l) x(n-m) \quad [5]$$

Here, when x (n) does not include a direct current (DC) component, the terms from the first to third of equation 5 do not appear, so that it is possible to represent the input-output of nonlinear adaptive filter 301 by equation 6. In most cases, x (n) does not include a direct current (DC) component, and a direct current (DC) component is cut. Also, when x (n) includes a direct current (DC) component, by cutting a direct current (DC) component, it is possible to represent the input-output of nonlinear adaptive filter 301 by equation 6.

(Equation 6)
$$y(n) = \sum_k \sum_l \sum_m c_3(k,l,m) x(n-k) x(n-l) x(n-m) \quad [6]$$

Here, compared with equation 4 and equation 6, when equation 7 holds, nonlinear adaptive filter 301 is equal to a filter where the functions of correction (inverse characteristic) filter 104 and cubic circuit 108 are built in adaptive filter 110.

$$c_3(k,l,m) = 6g(k)g(l)g(m) \quad \text{(Equation 7)}$$

Therefore, by adjusting coefficient $c_3$ of nonlinear adaptive filter 301 where the input-output is represented by equation 6, it is possible to achieve the same effect as correction (inverse characteristic) filter 104, cubic circuit 108, and adaptive filter 110. Thus, it is possible to generate a replica signal that includes a frequency characteristic of a reception circuit, so that it is possible to reduce the circuit scale compared with embodiment 1 and embodiment 2.

When nonlinear adaptive filter 301 is a Volterra type nonlinear adaptive filter, as an FIR filter, it is possible to update a filter coefficient by using an algorithm such as LMS. However, the present embodiment is required to form nonlinear adaptive filter 301 as a filtered-X Volterra filter, since LPF 109 is provided between nonlinear adaptive filter 301 and subtractor 111.

(Embodiment 4)

Figure 6:
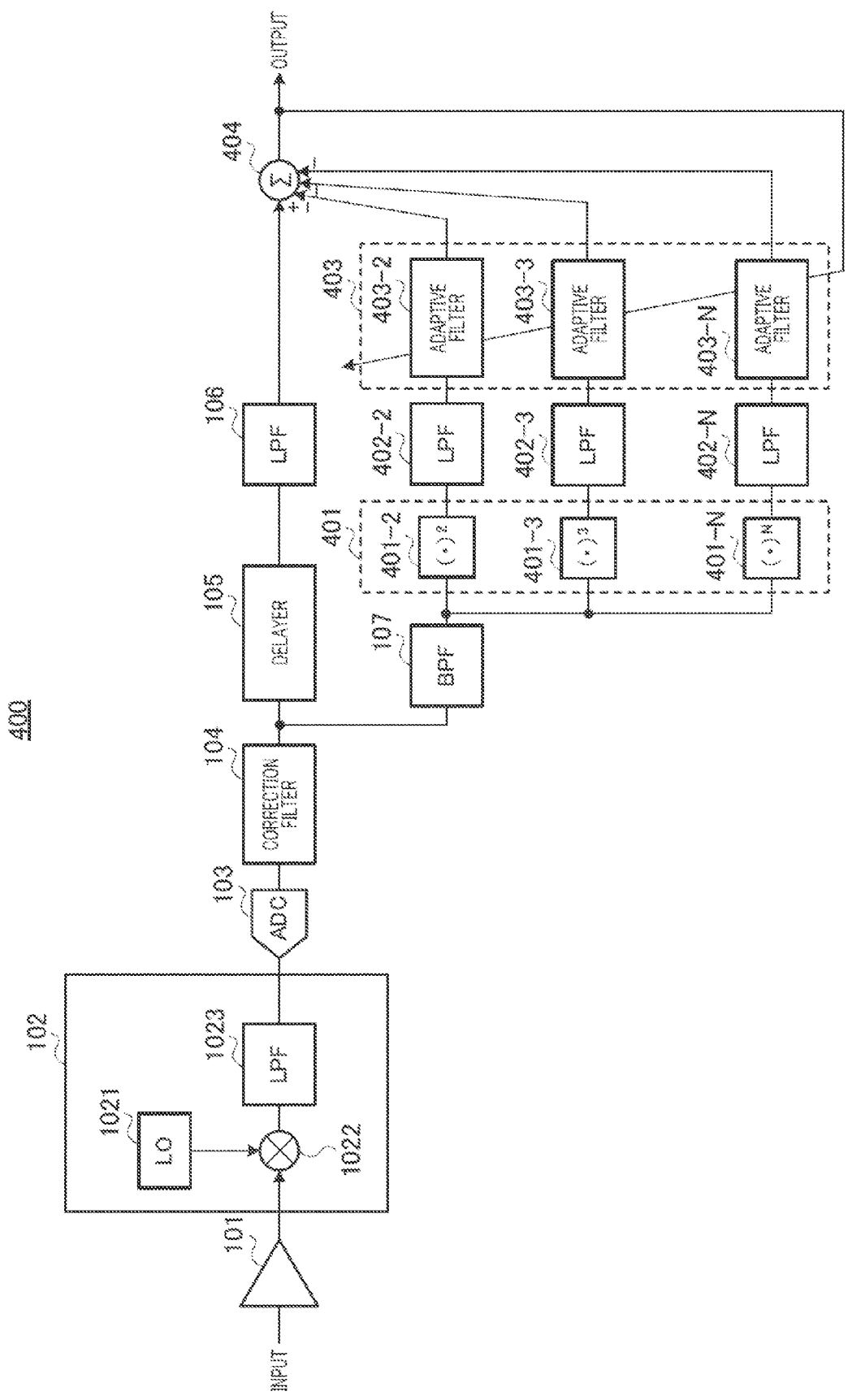
FIG. 6 is a block diagram showing a main configuration of a nonlinear distortion compensation receiver according to embodiment 4 of the present invention.

FIG. 6 is a block diagram showing a main configuration of a nonlinear distortion compensation receiver according to embodiment 4 of the present invention. In a nonlinear distortion compensation receiver according to the present embodiment of FIG. 6, the same components as FIG. 3 will be assigned the same reference numerals as FIG. 3 and their explanations will be omitted. Nonlinear distortion compensation receiver 400 of FIG. 6 employs a configuration having distortion generation circuit 401, LPFs 402-2~402-N, adaptive filters 403-2~403-N, and subtractor 404, instead of cubic circuit 108, LPF 109, adaptive filter 110, and subtractor 111 of nonlinear distortion compensation receiver 100 of FIG. 3.

Distortion generation circuit 401 includes second order distortion generation section 401-2, third order distortion generation section 401-3, . . . , and N-th order distortion generation section 401-N. Each n-th order distortion generation section 401-n (n=2, 3, . . . , N) generates a replica signal of n-th order distortion, and outputs the generated replica signal of n-th order distortion to LPF 402-n.

LPF 402-n (n=2, 3, . . . , N) band-limits a replica signal of n-th order distortion output from distortion generation circuit 401. LPF 402-n (n=2, 3, . . . , N) outputs the band-limited replica signal of n-th order distortion to adaptive filter 403-n (n=2, 3, . . . , N).

Adaptive filter 403-n (n=2, 3, . . . , N) assumes that output of LPF 402-n as input, and performs filter processing to a replica signal of the band-limited n-th order distortion, as adaptively changing a filter coefficient. Adaptive filter 403-n (n=2, 3, . . . , N) transmits a filter output signal after filter processing to subtractor 404. As adaptive filter 110, adaptive filter 403-n (n=2, 3, . . . , N) is formed by, for example, an FIR filter.

Subtractor 404 receives as input a reception signal (main path signal) band-limited by LPF 106, and an output signal of adaptive filter 403-n (n=2, 3, . . . , N). Also, subtractor 404 subtracts an output signal of adaptive filter 403-n from the main path signal, and outputs the subtracted result as a desired wave. Subtractor 404 feeds back the difference (subtracted result) between the main path signal and the output signal of adaptive filter 403-n (n=2, 3, . . . , N) as an error signal to adaptive filter 403-n.

As above, with the present embodiment, distortion generation circuit 401 generates a replica signal of n-th order distortion (n=2, 3, . . . , N). Adaptive filter 403-n performs filter processing to a replica signal of n-th order distortion, with updating a filter coefficient. Subtractor 404 subtracts an output signal of adaptive filter 403-n from a frequency band component of the extracted desired wave, and outputs the subtracted result as the desired wave. By this means, it is also possible to cancel not only third order distortion but arbitrary order distortion.

(Embodiment 5)

Embodiment 1 to embodiment 4 generate a replica signal of distortion in a digital circuit. By contrast with this, the present embodiment will explain a case to generate a replica signal of distortion at an analogue circuit.

Figure 7:
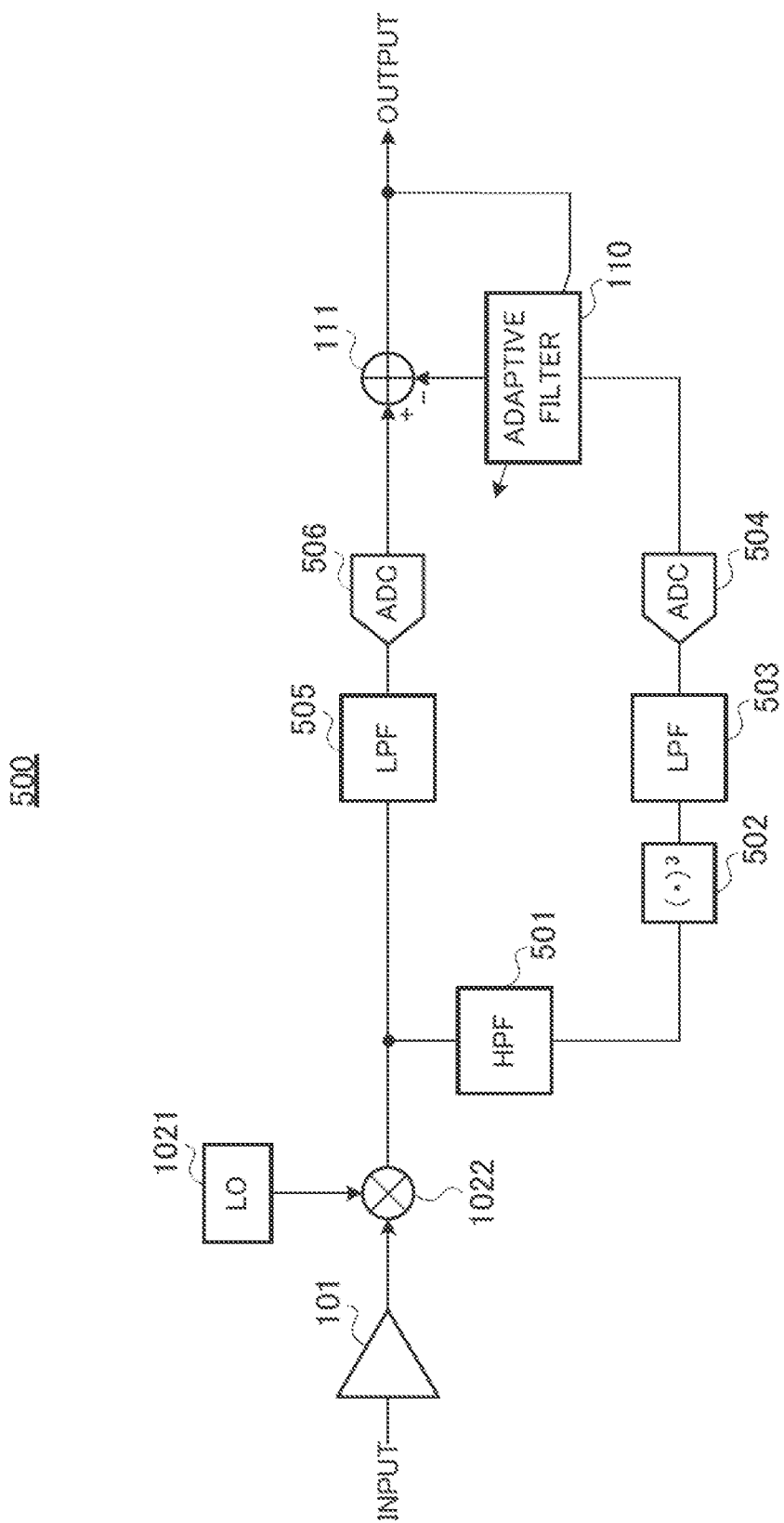
FIG. 7 is a block diagram showing a main configuration of a nonlinear distortion compensation receiver according to embodiment 5 of the present invention.

FIG. 7 is a block diagram showing a main configuration of a nonlinear distortion compensation receiver according to embodiment 5 of the present invention. In a nonlinear distortion compensation receiver according to the present embodiment of FIG. 7, the same components as FIG. 3 will be assigned the same reference numerals as FIG. 3 and their explanations will be omitted. With the present embodiment, nonlinear distortion compensation receiver 500 separates a signal frequency-converted by mixer 1022 into a main path and a replica path.

With the present embodiment, the main path includes LPF 505 and ADC 506, and the replica path includes high pass filter (HPF) 501, analog cubic circuit 502, LPF 503, ADC 504, and adaptive filter 110. Also, a reception signal frequency-converted by mixer 1022 is separated into the main path and the replica path in a previous stage to band-limit by LPF 505.

By band-limiting a replica path signal, HPF 501 removes a band component of a desired wave from a band component of a replica path signal. HPF 501 outputs a band-limited replica path signal to analog cubic circuit 502.

Analog cubic circuit 502 generates a IM3 replica by cubing a band-limited replica path signal. Analog cubic circuit 502 outputs the IM3 replica to LPF 503.

LPF 503 band-limits the IM3 replica and extracts only a frequency component of the IM3 replica. LPF 503 outputs the band-limited IM3 replica to ADC 504.

ADC 504 performs A/D conversion processing to a band-limited replica signal and outputs the A/D converted signal to adaptive filter 110.

LPF 505 band-limits the main path signal and extracts a frequency band component of a desired wave from a band component of the main path signal. LPF 505 outputs the band-limited main path signal to ADC 506.

ADC 506 performs A/D conversion processing to the band-limited main path signal, and outputs the A/D converted main path signal to subtractor 111.

As above, with the present embodiment, in the replica path, HPF 501 removes a frequency band component of a desired wave from a band component of the replica path signal. HPF 501 removes the frequency band component of the desired wave from the band component of the replica path signal, so that it is possible to compensate for distortion due to an interfering wave that is widely distributed and is other than a neighboring interfering wave.

(Embodiment 6)

The present embodiment will describe nonlinear distortion compensation receiver of when a desired wave is an OFDM signal.

Figure 8:
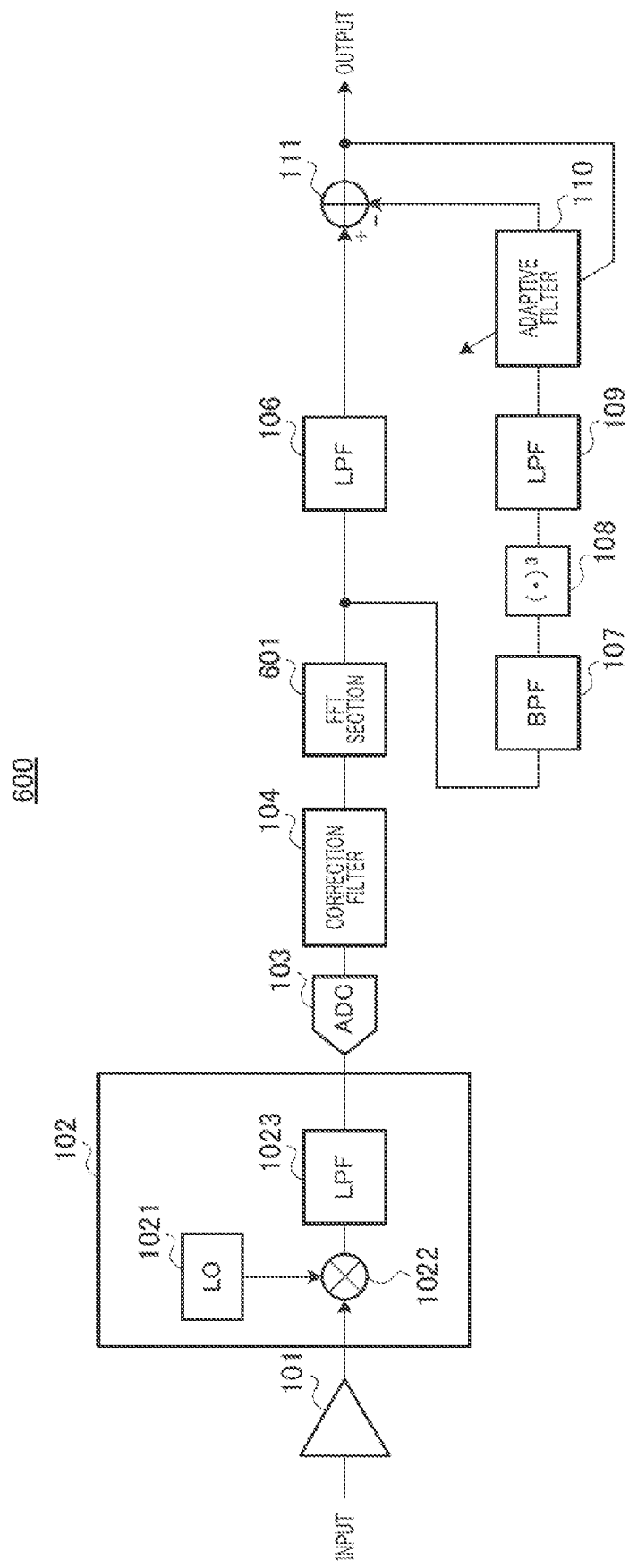
FIG. 8 is a block diagram showing a main configuration of a nonlinear distortion compensation receiver according to embodiment 6 of the present invention.

FIG. 8 is a block diagram showing a main configuration of a nonlinear distortion compensation receiver according to embodiment 6 of the present invention. In a nonlinear distortion compensation receiver according to the present embodiment of FIG. 8, the same components as FIG. 3 will be assigned the same reference numerals as FIG. 3 and their explanations will be omitted. Nonlinear distortion compensation receiver 600 of FIG. 8 employs a configuration that provides FFT section 601 in a rear stage of correction (inverse characteristic) filter 104 to nonlinear distortion compensation receiver 100 of FIG. 3, and removes delayer 105.

FFT section 601 is provided in a lager stage of correction (inverse characteristic) filter 104, performs a fast Fourier transform (FFT) to a signal after passing correction (inverse characteristic) filter 104, and converts into a frequency domain signal. Also, FFT section 601 separates the converted frequency domain signal into a main path and a replica path. After that, the signal processing in the main path and the replica path is performed in frequency domain, and convolution operations in time domain of the main path and the replica path are performed by replacing with multiplication of frequency domain. By this means, even when a reception signal is an OFDM signal, it is possible to perform distortion compensation precisely.

As above, in the present embodiment, FFT section 601 is described in a rear stage of correction (inverse characteristic) filter 104, so that even when a reception signal is an OFDM signal, it is possible to perform distortion compensation precisely.

(Another Embodiment)

Although the above embodiments have been explained on the premise that an input signal and output signal are real number signals, the present invention is not limited to this. For example, it is equally possible to perform distortion compensation to a complex number signal (I+jQ) represented by an in-phase (I) signal and quadrature (Q) signal after A/D conversion, when a nonlinear distortion compensation receiver is an orthogonal modem. In this case, it is obvious that "$|x|^N$" holds for an even-numbered multiplication not "$x^N$", and "$x|x|^{(N-1)}$" holds for an odd-numbered multiplication.

Also, although the above embodiments have explained correction (inverse characteristic) filter 104 as a fixed filter, it is equally possible to employ a configuration where the coefficient itself of correction (inverse characteristic) filter 104 adaptively updates.

Also, although the above embodiments have explained an adaptation algorithm in adaptive filter 110 as LMS, it is equally possible to use a recursive least squares (RLS) or other extending method of LMS. Also, it is possible to update coefficients (Volterra kernels) of nonlinear adaptive filter 301 by using LMS and RLS, and those extending method, as the linear filter.

Although the above explanation shows a configuration using BPF 107 as a filter for extracting an interfering wave, in addition to BPF 107, it is equally possible to use a high pass filter (HPF) that allows a wave other than a desired wave to pass.

Also, in the above explanation, by arranging correction (inverse characteristic) filter 104 in a previous stage to separate a main path signal and a replica path signal, it is possible to work compensation function of correction (inverse characteristic) filter 104 to both a desired wave and an interfering wave. It is equally possible to arrange correction (inverse characteristic) filter 104 after separating into a main path signal and a replica path signal, and to employ a configuration that compensates for a replica path signal only.

The disclosure of Japanese Patent Application No.2009-160031, filed on Jul. 6, 2009, including the specification, drawings and abstract, is incorporated herein by reference in its entirety.

Industrial Applicability

The nonlinear distortion compensation receiver and nonlinear distortion compensation method according to the present invention has a simple circuit configuration, can cancel a distortion component of a signal of a neighboring interfering wave, and is preferable to form a small and low power consumption receiver.

REFERENCE SIGNS LIST

100, 200, 300, 400, 500, 600 Nonlinear distortion compensation receiver
101 LNA
102 Direct sampling mixer
1021 LO
1022 Mixer
1023, 106, 109, 402-2-402-n, 503, 505 LPF
103, 504, 506 ADC
104 Correction (inverse characteristic) filter
105 Delayer
107 BPF
108 Cubic circuit
110, 403-2-403-N Adaptive filter
111, 404 Subtractor
201 Frequency converter
301 Nonlinear adaptive filter
401 Distortion generation circuit
401-n n-th order distortion generation section
501 HPF
502 Analog cubic circuit
601 FFT section

The invention claimed is:

1. A nonlinear distortion compensation receiver comprising:
    a sampling mixer that samples an input signal by frequency-converting and band-limiting the input signal;
    a correction filter that has an inverse characteristic of a frequency characteristic of the sampling mixer, corrects the frequency characteristic of a signal that is sampled by the sampling mixer, and outputs the corrected signal as a correction signal;
    a main signal extracting section that extracts a main path signal including a frequency band component of a desired wave from the correction signal;
    a replica signal generation section that extracts a frequency band component of an interfering wave from the correction signal as a replica path signal, and generates a replica signal of a nonlinear distortion component generated in the sampling mixer by using the frequency band component of the extracted interfering wave;
    an adaptive filter that performs adaptive filter processing to the replica signal with updating a filter coefficient; and
    a subtraction section that subtracts an output signal of the adaptive filter from the main path signal extracted by the main signal extracting section and outputs a subtracted result as a desired wave signal,
    wherein the adaptive filter updates the filter coefficient based on an output signal of the subtraction section.

2. The nonlinear distortion compensation receiver according to claim 1, wherein the nonlinear distortion compensation receiver is a low intermediate frequency type receiver, the nonlinear distortion compensation receiver further comprising a conversion section that frequency-converts the correction signal into a zero IF, at a rear stage of the correction filter.

3. The nonlinear distortion compensation receiver according to claim 1, wherein
    the generation section generates a replica signal of n-th order distortion as the replica signal, n being an integer that equals or exceeds two; and
    the adaptive filter performs the adaptive filter processing to replica signals of the n-th order distortion.

4. The nonlinear distortion compensation receiver according to claim 1, wherein the signal sampled by the sampling mixer is a complex signal formed by an in-phase signal and a quadrature signal.

5. The nonlinear distortion compensation receiver according to claim 1, further comprising a conversion section where the input signal is an orthogonal frequency division multiplexing signal, and that is provided in the rear stage of the correction filter, fast-Fourier-transforms an output signal of the correction filter, and outputs a Fourier-transformed signal, wherein:
 the main signal extracting section extracts the main path signal from the Fourier-transformed signal; and
 the replica signal generation section generates the replica signal from the Fourier-transformed signal.

6. The nonlinear distortion compensation receiver according to claim 1, wherein the correction filter can adaptively update the filter coefficient.

7. A nonlinear distortion compensation method comprising:
 sampling an input signal by frequency-converting and band-limiting the input signal;
 correcting a frequency characteristic of the signal that is sampled by the sampling, and outputting the corrected signal as a correction signal by using an inverse characteristic of the frequency characteristic of sampling processing;
 extracting a main path signal including a frequency band component of a desired wave from the correction signal;
 extracting a frequency band component of an interfering wave from the correction signal as a replica path signal and generating a replica signal of a nonlinear distortion component generated in the sampling processing by using the frequency band component of the extracted interfering wave;
 performing adaptive filter processing to the replica signal with updating a filter coefficient; and
 subtracting the replica signal where the adaptive filter processing is performed, from the extracted main path signal, and outputting a subtracted result as a desired wave signal,
 wherein the adaptive filter processing updates the filter coefficient based on a signal that shows the subtracted result.

* * * * *